United States ]
Hoop

3,847,141

Nov. 12, 1974

[54] ULTRASONIC BONE DENSITOMETER

[75] Inventor: James M. Hoop, Hazel Green, Ala.

[73] Assignee: The United States of America as represented by the Administrator of the National Aeronautics and Space Administration, Washington, D.C.

[22] Filed: Aug. 8, 1973

[21] Appl. No.: 386,789

[52] U.S. Cl. ................................ 128/2 V, 73/67.1
[51] Int. Cl. ............................................. A61b 10/00
[58] Field of Search ...... 128/2 V, 2 R, 205 Z, 20 A; 73/67.1, 67.2, 67.5

[56] References Cited
UNITED STATES PATENTS

| | | | |
|---|---|---|---|
| 3,345,863 | 10/1967 | Henry et al. | 73/67.5 |
| 3,477,422 | 11/1969 | Jurist, Jr. et al. | 128/2 R |
| 3,587,561 | 6/1971 | Ziedonis | 128/2.05 Z |
| 3,648,685 | 3/1972 | Hepp et al. | 128/2 L |

*Primary Examiner*—Kyle L. Howell
*Attorney, Agent, or Firm*—W. H. Riggins; L. D. Wofford, Jr.; John P. Manning

[57] ABSTRACT

A device for measuring the density of a bone structure so as to monitor the calcium content thereof. A pair of opposed spaced ultrasonic transducers are held within a clamping apparatus closely adjacent the bone being analyzed. These ultrasonic transducers incude piezoelectric crystals shaped to direct signals through the bone encompassed in the heel and finger of the subject being tested. A pulse generator is coupled to one of the transducers and generates an electric pulse for causing the transducers to generate an ultrasonic sound wave which is directed through the bone structure to the other transducer. An electric circuit, including an amplifier and a bandpass filter couples the signals from the receiver transducer back to the pulse generator for retriggering the pulse generator at a frequency proportional to the duration that the ultrasonic wave takes to travel through the bone structure being examined. An oscilloscope and frequency counter is coupled to the bandpass filter for determining the frequency that the pulse generator is retriggered so as to determine changes in the calcium content of the bone being analyzed.

5 Claims, 4 Drawing Figures

ULTRASONIC BONE DENSITOMETER

ORIGIN OF THE INVENTION

The invention described herein, was made by an employee of the United States Government, and may be manufactured and used by or for the Government for governmental purposes without the payment of any royalties thereon or therefor.

BACKGROUND OF THE INVENTION

This invention relates generally to an ultrasonic bone densitometer, and more particularly to a device for monitoring the calcium content of bone structures.

Recently, as a result of long travel in outer space, it has been determined that due to inactivity of astronauts and the like, the calcium content of the astronauts bones tend to decrease. It is important to monitor this condition so that the astronaut's bone strength will not deteriorate to a dangerous level. Another cause of the loss of this calcium is due to the weightlessness of "zero" gravity conditions encountered in outer space.

It has been found that it is very important to monitor this bone, or calcium condition, so as to take appropriate steps to correct the condition if it approaches a dangerous level. One means of correcting this deficiency of calcium is by increasing the amount of exercise of the astronaut. Of course, another way of preventing this calcium deficiency is by taking internal medicine.

Ultrasonic devices have been utilized for measuring the physical properties of various components, such as bones and muscles, and examples of such devices are disclosed in U.S. Pat. No. 3,477,422 granted to J. M. Jurist, Jr., et al. on Nov. 11, 1969, and U.S. Pat. No. 3,345,863 granted to E. A. Henry, et al. on Oct. 10, 1967. While these devices may operate satisfactorily for the purposes intended, it is important to have a bone densitometer which can be conveniently utilized by astronauts and the like, which insures the positive positioning of the bone, such as the heel bone (os calcis), and the second joint of the third finger of the left hand (finger phalanx L-4-2). These two bones represent a normally active high stressed bone and a normally inactive low stressed bone. By examining these particular bones, generally the overall condition of calcium content of the bones of the astronauts can be determined.

SUMMARY OF THE INVENTION

The invention comprises a pair of clamping devices provided for determining the calcium content of a finger bone and a heel bone of the subject being tested. Each of the clamping devices includes means for accurately and positively clamping the bone being analyzed between a pair of ultrasonic transducers. One of the transducers acts as a transmitting transducer, while the other acts as a receiving transducer. Pulses are fed to the transmitting transducer producing a ringing sound which is directed through the bone being tested. The receiver transducer, in turn, takes this sound and generates a signal responsive thereto, which is utilized to retrigger the pulse generator. The frequency that the pulse generator is retriggered is proportional to the calcium content of the bone being analyzed. An oscilloscope and frequency counter is provided for monitoring the frequency produced by the receiver transducer.

Accordingly, it is a general object of the present invention to provide an improved bone densitometer.

A more specific object of the invention is to provide an ultrasonic bone densitometer which can be operated accurately by relatively inexperienced personnel.

Still another important object of the present invention is to provide an ultrasonic bone densitometer which utilizes mechanical means for promptly and accurately positioning piezoelectric elements adjacent the bone being examined.

Still another important object of the present invention is to provide an ultrasonic bone densitometer which utilizes an apparatus for focusing sound waves created by piezoelectric transducers towards a predetermined bone.

These and other objects and advantages of the invention will become apparent upon reference to the following specification, attendant claims and drawings.

Figure 1:
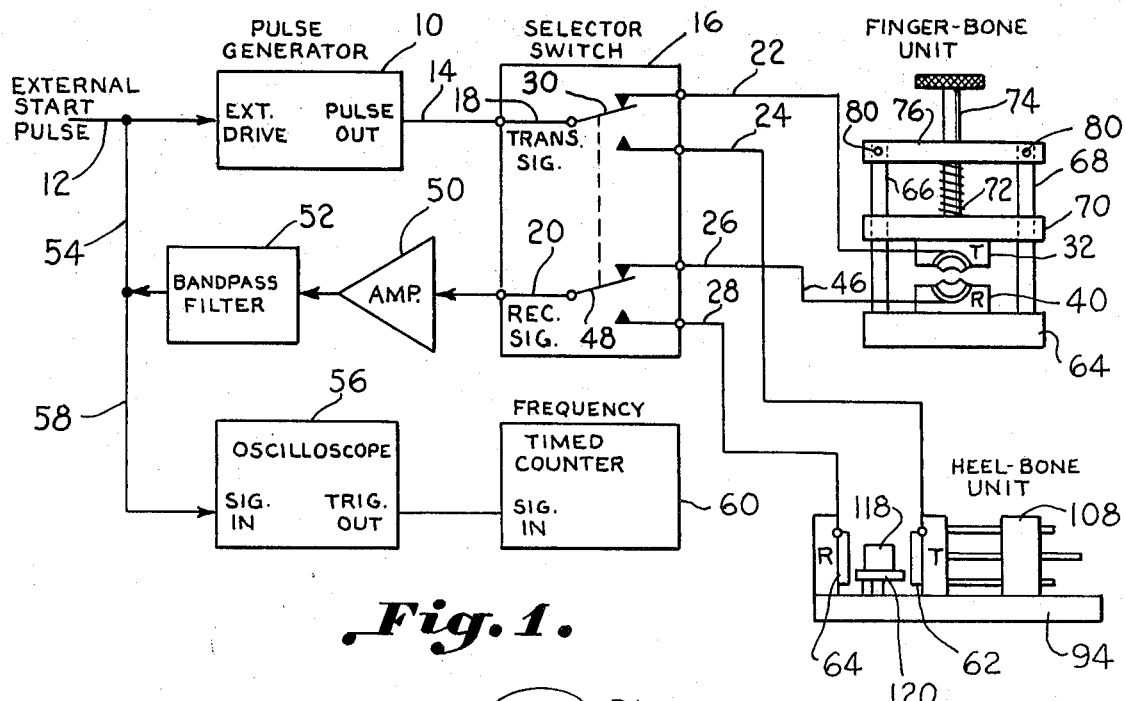
FIG. 1 is a block diagram illustrating an ultrasonic bone densitometer constructed in accordance with the present invention.

Referring in more detail to FIG. 1 of the drawings, there is illustrated a pulse generator 10 which has an input terminal 12. An external start pulse is applied to the input terminal 12 which causes a pulse to be generated on output lead 14 of the pulse generator. The output lead 14 of the pulse generator is coupled to a selector switch 16. The selector switch 16 has two inputs 18 and 20, and four output leads 22, 24, 26 and 28. The input lead 18 of the selector switch 16 can be coupled through a movable contact 30 to either output leads 22 or 24. When the movable contact 30 is coupled to output lead 22 such sends a pulse to an ultrasonic transducer designated as the transmitter transducer 32 which is associated with a clamping apparatus for measuring the calcium content of a finger of a person being examined. Normally the second joint of the third finger of the left hand is selected for measurement. The transmitter transducer 32 includes an arcuate shaped piezoelectric crystal 32, which has an arcuate shaped silicone rubber pad 36 adherred thereto by any suitable means, such as adhesive.

Figure 4:
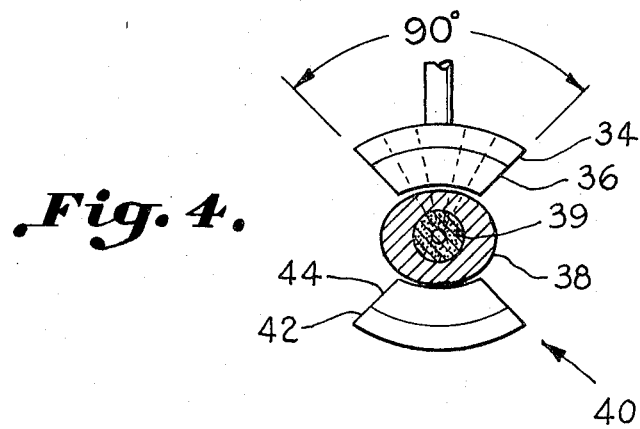
FIG. 4 is a sectional view illustrating a finger being inserted between a pair of piezoelectric transducers forming part of the subject invention.

A semi-circular piezoelectric crystal 34 (FIG. 4) encompasses an arc of approximately 90° so as to focus the sound waves generated by the pulse being applied thereto towards the bone, and more particularly to the walls of the bone of a patient's finger. As can be seen in FIG. 4, the subjects finger is identified by the reference character 38 with the wall of the bone being identified by the reference character 39.

Diametrically oppposed from the transmitter transducer 32 is a receiver ultrasonic transducer 40. The receiver transducer 40 also includes a piezoelectric element 42 that is separated from the finger by a silicone rubber pad 44. In one particular embodiment, the piezoelectric crystals 34 and 42 are approximately one-tenth of an inch thick, whereas, the pad 36 is approximately one-fourth of an inch thick, and the pad 44 is between one-eight and three sixteenths of an inch thick. The length of the piezoelectric crystals 34 and 42 are approximately one inch.

When the external pulse being fed over lead 22 is applied to the transmitter transducer 32 a ringing sound is produced which is directed through the finger of the subject being tested. The receiver transducer 40, in turn, detects this sound wave and generates a signal responsive thereto. This signal is fed over lead 46 to output terminal 26 of the selector switch. It then passes through movable contact 48 of the selector switch 16 to an amplifier 50 which amplifies the signal. The output of the amplifier 50 is fed into an input of a bandpass filter network 52.

The bandpass filter 52 is set to pass signals in a band of 25 to 125 kilohertz which encompasses a predetermined range adequate for examining the finger and heel elements of the subject. One purpose of the bandpass filter is to prevent retriggering of the pulse generator 10 by the natural frequency of the transducer 40. The output of the bandpass filter 52 is fed back to the input of the pulse generator 10 over lead 54, as well as to an oscilloscope 56 by means of lead 58. When the signal from the bandpass filter 52 is fed back to the input of the pulse generator 10 such causes the pulse generator to be retriggered. The frequency that the pulse generator 10 is retriggered is proportional to the density of the bone being tested. When the density of the bone decreases, as a result of a loss of calcium, the frequency of reoccurring pulses being generated by the pulse generator as a result of the velocity of the signals flowing through the bone being examined increases. A frequency counter 60 is coupled to the output of the oscilloscope 56 for counting the frequency of the signals being produced by the receiver transducer 40. The oscilloscope 56 is intended to give a visual picture of the frequency being received from the receiver transducer 40.

It is important that the frequency count be taken a set predetermined time after the initial external pulse, since the flesh of the subject will tend to flow as a result of the pressure being applied by the clamps holding the transducers 32 and 40. During this test the finger also tends to heat up, which would have some effect on the frequency being detected.

By moving the movable contacts 30 and 48 to the lower positions such are in contact with output leads 24 and 28 of the selector switch which are, in turn, coupled to a transmitter transducer 62 and receiver transducer 64 of a heel bone unit. The heel bone unit operates in the same manner electrically as the finger bone unit.

Figure 2:
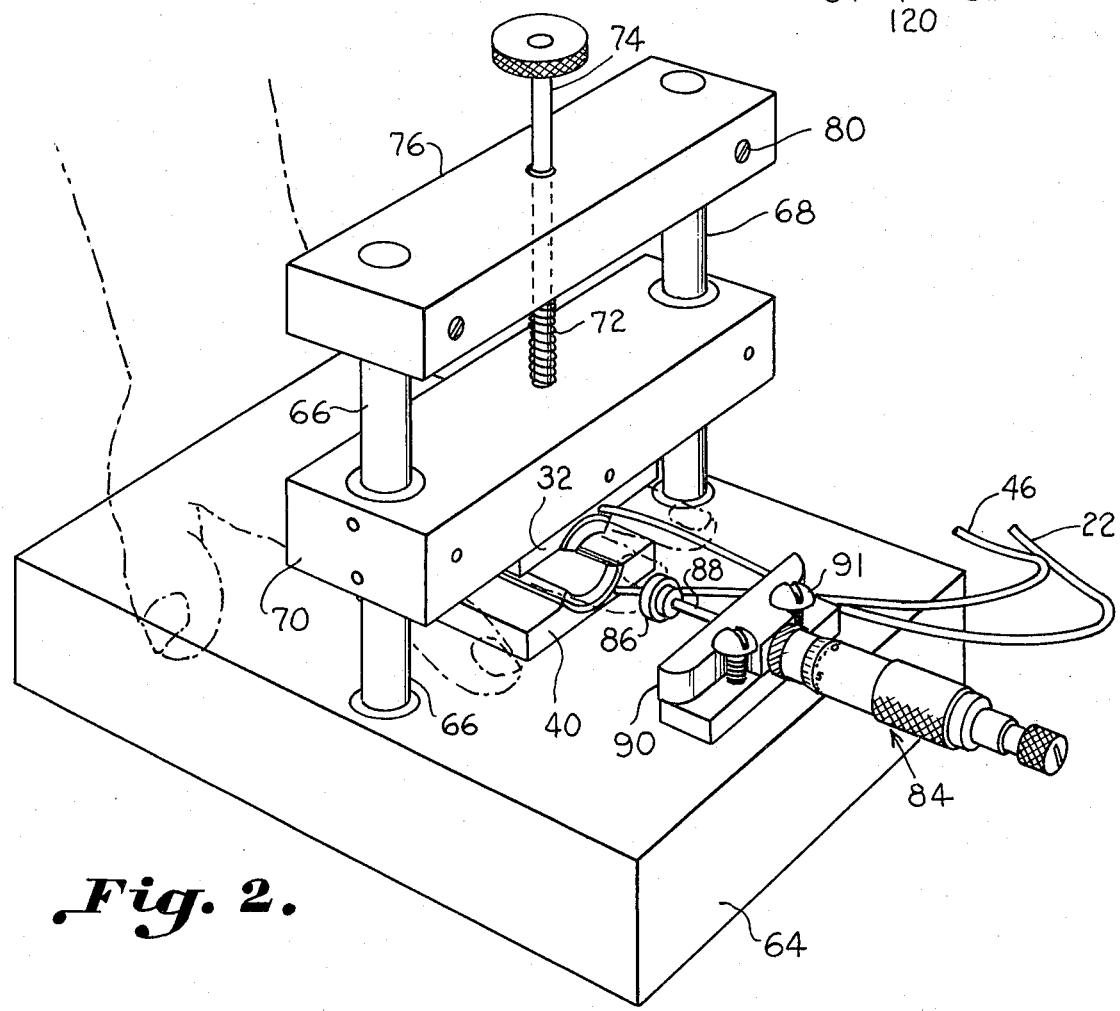
FIG. 2 is a perspective view illustrating a clamping apparatus which aids in positioning a piezoelectric transducer and receiver accurately relative to a finger of the person being tested.

Referring in more detail to FIG. 2, there is illustrated a finger testing apparatus. This apparatus includes a base block 64 which has a pair of spaced vertical rods 66 and 68 extending uwardly therefrom. Positioned above the block 64 is a rectangular member 70 which has holes extending therethrough so that such can ride up and down on the vertical rods 66 and 68. Positioned on the bottom of the rectangular member 70 is the piezoelectric transducer 32.

In order to maintain an adjustable but constant pressure between the piezoelectric elements 32 and 40 and the finger of the subject being tested, a spring 72 is carried on a rod 74 positioned between the vertical rods 66 and 68. The rod 74 extends from an upper surface of rctangular member 70 through a hole in an upper rectangular member 76. Setscrews 80 are carried in the sides of upper member 76 for locking the upper member 76 to the rods 66 and 68. The spring 72 is carried on rod 74 and abuts against the upper surface of rectangular member 70 and a lower surface of rectangular member 76. By adjusting the vertical position of the upper member 76 on the rods 66 and 68 the pressure applied to the lower member 70 and, in turn, to the piezoelectric crystals 32 and 40 by spring 72 can be varied.

In order to insure proper placement of the finger relative to the piezoelectric transducer 32 a micrometer controlled plunger generally designated by the reference character 84, is provided for engaging the tip of the finger. The plunger includes a stop member 86 carried on the end of a rod 88 which extends through a block 90 that is fixed to base member 64 by screws 91. The rod 88 can be adjusted horizontally by rotating the micrometer adjusting head 84, which in turn, varies the position of the stop 86 relative to the end of the finger.

Figure 3:
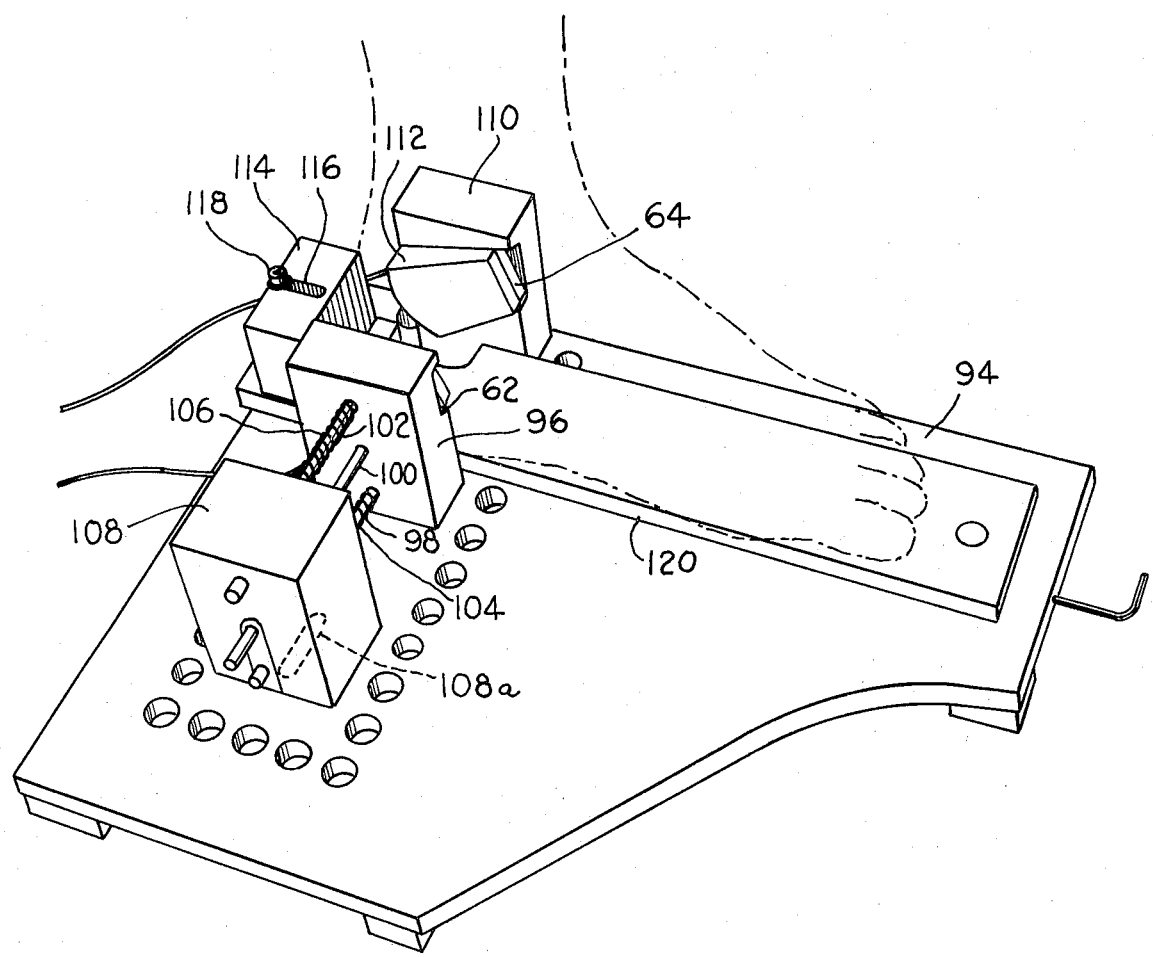
FIG. 3 is a perspective view illustrating an apparatus for properly positioning a heel of the person being monitored relative to a piezoelectric transducer forming part of the densitometer.

Referring in more detail to FIG. 3 of the drawings, there is illustrated the heel bone unit. The heel bone unit is supported on a base plate 94. The transmitter piezoelectric transducer 62 is carried on an adjustable block 96 which is supported by vertically spaced horizontal rods 98, 100 and 102. Springs 104 and 106 are carried on the upper and lower horizontal rods 98 and 102 for applying a predetermined pressure on the block 96. The other end of the springs 104 and 106 engage an inner surface of a block 108. The block 108 has a bolt (not shown) extending through an elongated slot 108a in the supporting base member 94 so that its position can be adjusted on the base member 94. The receiver piezoelectric transducer 64 is supported on a space block 110 directly opposite the transmitter piezoelectric transducer 62. A silicone rubber pad 112 is carried on the outer surface of the piezoelectric transducer 64 and is tapered so as to conform to the contour of the heel of the subject being tested. A similar pad is provided closely adjacent the transmitter transducer 62.

An adjustable block 114 is carried between the transmitter and receiver transducers 62 and 64 for engaging the base of the heel of the subject being tested so as to assure proper positioning of the heel.

In order to enable the position of the block 114 to be adjusted between the transmitter and the receiver transducers 62 and 64 a bolt 118 extends through an elongated slot 116 carried in the block 114. The lower end of the bolt engages a pad 120 carried on the base support member 94. By loosening the bolt 118 the position of the block 114 can be adjusted.

The operation of the unit shown in FIG. 3 for monitoring the calcium content of the heel bone is identical from an electrical standpoint as the device shown in FIG. 2. The subject being tested places his foot on the horizontal support 120 with the heel of his foot abutting against the adjustable block 114. The block 108 is adjusted laterally relative to the foot so as to apply a uniform pressure thereto. The switch 16 is then shifted downwardly so that the leads 18 and 20 are in contact with leads 24 and 28, respectively. An external start pulse is applied to the pulse generator 10 which causes the transducer 62 to generate an ultrasonic sound wave which is directed through the heel bone of the subject. The receiver transducer 64 detects the signal flowing through the heel bone and, in turn, generates an electric signal which is fed through the amplifier 50 of the bandpass filter 52 back to the pulse generator 10 for retriggering the pulse generator. The frequency of these retriggering pulses is proportional to the density of the heel bone. The oscilloscope 56 and frequency counter are used for determining and monitoring the frequency of the retriggering pulse.

While a preferred embodiment of the invention has been described using specific terms, such description is for illustrative purposes only, and it is to be understood that changes and variations may be made without departing from the spirit or scope of the following claims.

What is claimed is:

1. An apparatus for measuring the density of a bone structure so as to monitor the calcium content thereof comprising:
   a. A pair of opposed spaced ultrasonic transducers, one acting as a transmitter and the other acting as a receiver;
   b. a clamping means supporting said transducers in spaced relation for accommodating said bone structure to be examined therebetween;
   c. said clamping means including means for positioning said bone structure in a constant orientation with respect to said pair of opposed spaced ultrasonic transducers;
   d. means for regulating the pressure applied by said pair of opposed spaced transducers on said bone structure being examined;
   e. a pulse generator means coupled to said transmitter transducer generating an electric pulse for causing said transmitter transducer to generate an ultrasonic sound wave which is directed through said bone structure to said receiver transducer;
   f. an electrical circuit means coupled between said receiver transducer and said pulse generator for retriggering said pulse generator responsive to said receiver transducer receiving said ultrasonic sound wave; and
   g. frequency indicating means coupled to said circuit means;
   whereby the frequency that said pulse generator is retriggered is proportional to the duration that said ultrasonic wave takes to travel through said bone being examined which varies according to the calcium content of said bone being examined.

2. The apparatus as set forth in claim 1, wherein each of said pair of spaced ultrasonic transducers includes:
   a. piezoelectric crystals; and
   b. said piezoelectric crystals being arcuately shaped for focusing energy produced by said transmitting transducer towards the bone of a finger when said finger is positioned between said ultrasonic transducers.

3. The apparatus as set forth in claim 2, further comprising:
   a. a calibrated adjustable abutting member carried adjacent said spaced ultrasonic transducers for engaging the tip of the finger when said finger is inserted between said transducers for insuring that said finger is in the same position when the measurements are taken at different times.

4. The apparatus as set forth in claim 1, wherein each of said pair of spaced ultrasonic transducers includes:
   a. piezoelectric crystals;
   b. inclined spaced supporting members having said piezoelectric crystals mounted thereon; and
   c. means for adjusting said supporting members to vary the spacing therebetween for closely accommodating the heel bone of a person.

5. The apparatus as set forth in claim 1, wherein said electrical circuit means coupled between said receiver transducer and said pulse generator includes:
   a. an amplifier coupled to said receiver transducer for amplifying signals produced by said receiver transducer responsive to said receiver transducer receiving said ultrasonic sound waves; and
   b. a bandpass filter coupled between said amplifier and said pulse generator for passing signals in a predetermined frequency range.

* * * * *